April 10, 1956  H. W. ADAMS, JR  2,741,741
DEVICE FOR TESTING OR MEASURING CAPACITANCE OR INDUCTANCE
Filed Nov. 25, 1952
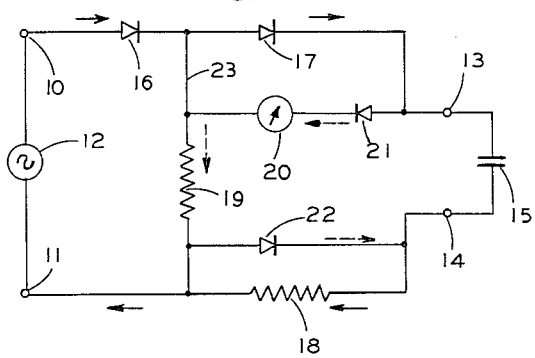
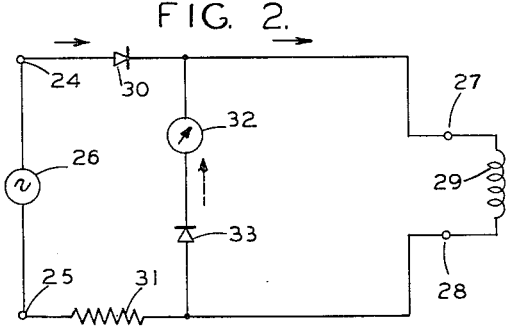
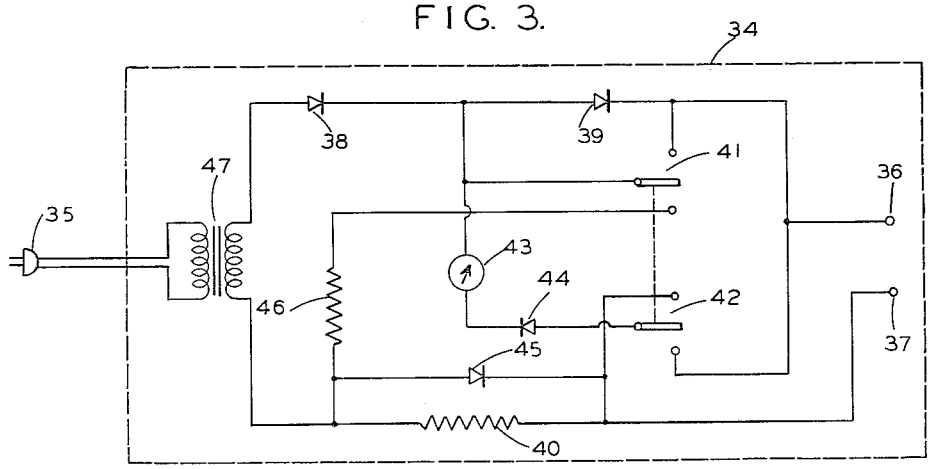
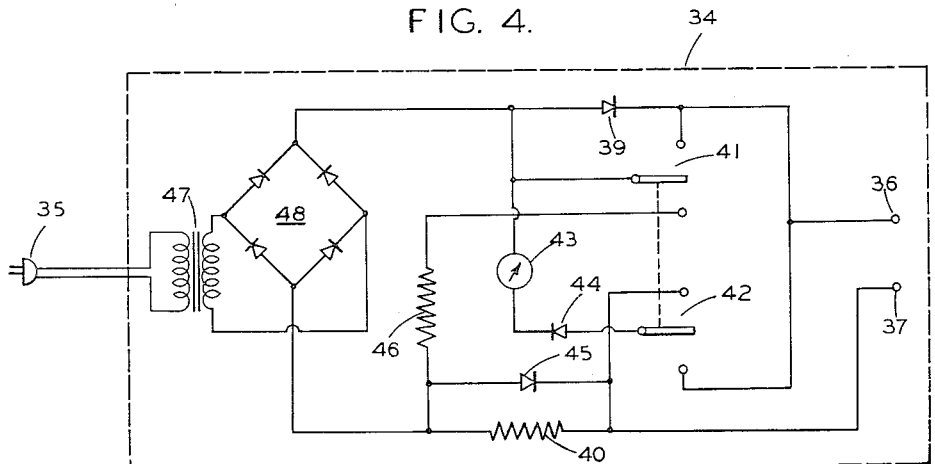
INVENTOR
HENRY W. ADAMS, JR.
BY HIS ATTORNEYS
Howson & Howson

United States Patent Office 2,741,741
Patented Apr. 10, 1956

2,741,741
DEVICE FOR TESTING OR MEASURING CAPACITANCE OR INDUCTANCE

Henry W. Adams, Jr., Darby, Pa.

Application November 25, 1952, Serial No. 322,520

9 Claims. (Cl. 324—59)

This invention relates to devices for testing reactive electrical elements, i. e. for determining capacitance or inductance of capacitors or inductors.

Various forms of bridge-type measuring or testing devices have been employed in the past for the testing of reactive electrical elements, especially for the testing of condensers which are widely employed in electrical systems. Such devices involve bridge networks usually in the form of a Wheatstone bridge and they operate on the principle of comparison or balance of reactances. Devices of this type are costly and they are also subject to change of values of the elements in the bridge circuit.

Other devices have been proposed for the testing of condensers which operate by measurement of charging or discharging current, but such devices have been objectionable for one reason or another and as far as is known they have never gone into commercial use.

The principal object of the present invention is to provide a simple and inexpensive system which will give accurate and direct indication of capacitance or inductance of a capacitor or inductor being tested.

In the system according to this invention, a current meter is connected in a loop circuit with the reactive element to be tested, unidirectional current pulses are supplied to said element, and provision is made for preventing the supplied current pulses from flowing through the meter and for permitting current flow from said element as an effective source through the loop circuit including the meter. It may be said that the supplied current pulses constitute a primary current, and that the current which flows through the meter from the element being tested constitutes a secondary current which results from the application of the primary current to said element. The secondary current is measured by the meter, the scale of which may be calibrated directly in terms of capacitance or inductance.

The invention may be clearly understood by reference to the accompanying drawings, in which Fig. 1 is a diagrammatic illustration of a system according to the present invention for the testing of capacitors;

Fig. 2 is a diagrammatic illustration of a system according to the invention for the testing of inductors;

Fig. 3 is a diagrammatic illustration of a device which embodies both of the circuits of Figs. 1 and 2 and which may be used for the testing of either capacitors or inductors; and Fig. 4 is a diagrammatic illustration of a device similar to that of Fig. 3 but employing a full wave rectifier which doubles the number of supplied pulses.

Referring first to Fig. 1, the system shown has input terminals 10 and 11 to which an alternating current source 12 is to be connected, and terminals 13 and 14 to which any capacitor to be tested, as represented at 15, is to be connected. Unidirectional current pulses are supplied to the capacitor 15 from the alternating current source 12 through a charging circuit for the capacitor 15 which extends from terminal 10 through unidirectionally conductive devices 16 and 17 to one side of the capacitor 15, and from the other side of the capacitor 15 through resistor 18 to the other input terminal 11. The purposes of the devices 16 and 17 will be clear presently. A resistor 19 is connected between the opposite sides of the charging circuit as shown. A current meter 20 is connected in a loop circuit with the capacitor 15, the loop circuit also including resistor 19 and unidirectionally conductive devices 21 and 22. Connection 23 effectively short circuits the meter as far as the supplied current pulses are concerned. Device 21 permits current flow through the meter in only one direction, while device 22 short circuits resistor 18 during discharge of the capacitor.

In operation of the system shown in Fig. 1, only alternate half-cycles of the alternating current from source 12 are permitted to flow in the system due to the presence of the unidirectionally conductive device 16 which acts as a one-way valve. Moreover, the current pulses supplied to the capacitor 15 are prevented from flowing in the meter 20 by virtue of the connection 23 and the presence of the unidirectionally conductive device 21. The current flow path during the alternate half-cycles which are accepted by the system is indicated by the solid line arrows. As far as the supplied current pulses are concerned, the meter 20 is effectively short-circuited. During each accepted half-cycle of the source 12, the capacitor 15 is charged to a certain voltage. During each time interval between two consecutive charging pulses, discharge current flows from the capacitor 15 through the loop circuit including the meter 20, the resistor 19, and the devices 21 and 22. The latter device short circuits resistor 18 as far as discharge current is concerned. The current path of the discharge current is indicated by the broken line arrows. The magnitude of the discharge current flowing through meter 20 is proportional to the energy stored in the capacitor which in turn is proportional to the capacitance of the capacitor. Accordingly, the discharge current is proportional to the capacitance of the capacitor and is a measure thereof. With a voltage source of suitable frequency, e. g. 60 cycles per second, the meter indication is continuous due to the rapidity with which the charging and discharging portions of each operating cycle take place. By suitable calibration of the scale of meter 20, the meter may be caused to indicate directly the capacitance of the capacitor 15 under test.

Referring now to Fig. 2, the system shown therein is adapted for the testing of inductance of any inductor. The system has input terminals 24 and 25 to which an alternating voltage source 26 is connected, and it also has terminals 27 and 28 to which any inductor, such as represented at 29, is connected for test. Alternate half-cycles of the alternating current source are permitted to flow to the inductor 29 through the unidirectionally conductive device 30 and resistor 31. A meter 32 is connected in a loop circuit with the inductor 29, and a unidirectionally conductive device 33 is included in the loop circuit.

During the accepted half-cycles, current flows to the inductor 29 as indicated by the solid line arrows, and such current is prevented from flowing through the meter 32 due to the presence of the unidirectionally conductive device 33. During the time intervals between the supplied current pulses, the electrical inertia of the inductor 29 causes current flow through the closed loop circuit including the inductor 29 and the meter 32, the current flowing through meter 32 as indicated by the broken line arrow. The current flow through the meter is proportional to the inductance of the inductor 29 and is, therefore, a measure thereof. By suitably calibrating the scale of meter 32, it may be caused to indicate the measured inductance directly.

In Fig. 3, there is shown a composite system, as actually constructed and operated, which combines the systems of Figs. 1 and 2 and is adapted for measurement of either capacitance or inductance. A casing or housing, represented in broken line outline at 34, serves to house the elements, the device as constructed being portable. A conventional plug 35 serves to connect the device to an alternating current outlet. The device has terminals 36 and 37 to which either a capacitor or an inductor may be connected for testing thereof. These terminals may be in the form of receptacles to receive jack plugs of a test cable. A unidirectional current flow path extends through unidirectionally conductive devices 38 and 39 and resistor 40. Two ganged switches 41 and 42 are provided which serve to condition the system for the testing of capacitors or inductors. Current meter 43, unidirectionally conductive devices 44 and 45, and resistor 46 are connected as illustrated. The meter may have two scales calibrated respectively in terms of capacitance and inductance. An isolation transformer 47 is preferably employed as shown.

To condition the system for the testing of a capacitor, the ganged switches 41 and 42 are thrown to their lower position, and it may be seen that the circuit connections are then identical with those in Fig. 1. The operation of the system in the testing of a capacitor is exactly the same as described above in connection with Fig. 1.

To condition the system for the testing of an inductor, the ganged switches 41 and 42 are thrown to their upper positions. The effective circuit connections are then identical with those of Fig. 2. The operation of the system in the testing of an inductor is exactly the same as described above in connection with Fig. 2.

It will be seen that the switches 41 and 42 serve as on-off switches for the testing of either a capacitor or an inductor. A range switch (not shown) may be included to change the values of resistor 40 and/or resistor 46 to make several ranges available.

In a physical embodiment of the device shown in Fig. 3, the unidirectional elements are 100 ma. selenium rectifiers. Resistor 40 has a resistance of 750 ohms, while resistor 46 has a resistance of 2000 ohms.

It should be noted that the terminals 36 and 37 can be short circuited when the device is turned on, without causing any damage. Resistor 40 is always in the circuit when the device is turned on and serves to limit the current flow. Thus accidental shorting of test leads will not cause any damage.

Instead of employing only alternate half-cycles of the alternating voltage source as in the systems above described, the entire alternating cycle may be utilized to provide current pulses for supply to the capacitor or inductor to be tested. Fig. 4 shows a device similar to that of Fig. 3 but adapted to utilize the entire cycle of the alternating current source. A full wave rectifier 48 of conventional form serves to supply unidirectional pulses to the circuit. During the time between peaks of the supplied current pulses, current flows through meter 43, and the meter gives a continuous indication of capacitance or inductance being measured. The operation is the same as in the device of Fig. 3, the only difference being that the entire cycle of the alternating voltage source is used.

In any of the systems above described, the unidirectionally conductive devices employed may be any known device which operates as a one-way electrical valve. While a particular symbol has been used in representing these devices in the drawings, it is to be understood that no limitation to a particular device is intended. These one-way devices may be diodes or any other known device.

It should be noted further that while resistors are employed as load devices in the systems illustrated, it is possible to employ reactance elements for the same purpose. For example, in the system of Fig. 1, an inductance could be substituted for the resistance 19 if the inductance were given a suitable value.

While the invention has been described with reference to certain embodiments, it is not limited thereto but contemplates such modifications or other embodiments as may occur to those skilled in the art.

I claim:

1. In a system for testing a reactive electrical element, means for supplying unidirectional current pulses to said element, a current meter, means to connect said meter in a loop circuit with said element, and means including a non-mechanical rectifier device connected in series with said meter in the loop circuit for preventing the supplied pulses from flowing through said meter and for permitting current flow from said element as an effective source through the meter.

2. In a system for testing a reactive electrical element, a unidirectionally conductive circuit for conducting current to said element, an alternating current source connected to said circuit, the undirectional conductivity of said circuit permitting flow therein only of alternate half cycles of the alternating current as current pulses, a current meter, means to connect said meter in a loop circuit with said element, and means including a non-mechanical rectifier device connected in series with said meter in the loop circuit for preventing the supplied pulses from flowing through said meter and for permitting current flow from said element as an effective source through the meter.

3. In a system for testing a reactive electrical element, a circuit for conducting current to said element, a source of alternating current, a non-mechanical full wave rectifier connected between said source and said circuit to supply unidirectional current pulses to said circuit and thence to said element, a current meter, means to connect said meter in a loop circuit with said element, and means including a non-mechanical rectifier device connected in series with said meter in the loop circuit for preventing the supplied pulses from flowing through said meter and for permitting current flow from said element as an effective source through the meter.

4. In a system for testing capacitance of a capacitor, a circuit for supplying unidirectional current pulses to said capacitor, a resistor, means to connect said resistor across said circuit, a current meter, means to connect said meter between one end of said resistor and the corresponding side of said capacitor in parallel with a portion of said circuit, and unidirectionally conductive means in series with said meter between said end of said resistor and said side of said capacitor for preventing the supplied pulses from flowing through said meter and for permitting current flow from said capacitor as an effective source through the meter.

5. In a system for testing capacitance of a capacitor, a unidirectionally conductive circuit for conducting current to said capacitor, an alternating current source connected to said circuit, the unidirectional conductivity of said circuit permitting flow therein only of alternate half cycles of the alternating current as current pulses, a resistor, means to connect said resistor across said circuit, a current meter, means to connect said meter between one end of said resistor and the corresponding side of said capacitor in parallel with a portion of said circuit, and unidirectionally conductive means in series with said meter between said end of said resistor and said side of said capacitor for preventing the supplied pulses from flowing through said meter and for permitting current flow from said capacitor as an effective source through the meter.

6. In a system for testing inductance of an inductor, a circuit for supplying unidirectional current pulses to said inductor, a current meter, means to connect said meter across said circuit in parallel relation with said inductor, and a non-mechanical rectifier in series with said meter for preventing the supplied pulses from flowing through said meter and for permitting current flow from said inductor as an effective source through the meter.

7. In a system for testing inductance of an inductor, a unidirectionally conductive circuit for conducting current to said inductor, an alternating current source connected to said circuit, the unidirectional conductivity of said circuit permitting flow therein only of alternate half cycles of the alternating current as current pulses, a current meter, means to connect said meter across said circuit in parallel relation with said inductor, and a non-mechanical rectifier in series with said meter for preventing the supplied pulses from flowing through said meter and for permitting current flow from said inductor as an effective source through the meter.

8. In a system for testing capacitance of a capacitor, a circuit for supplying unidirectional charging current pulses to said capacitor, a first resistor in series in said circuit, unidirectionally conductive means in shunt with said resistor to short-circuit the resistor during discharge of said capacitor while permitting charging current to flow through said resistor, a second resistor, means to connect said second resistor across said circuit in parallel relation with said capacitor and said first resistor, a current meter, means to connect said meter between one end of said second resistor and the corresponding side of said capacitor in a circuit branch in parallel with a portion of said circuit, unidirectionally conductive means in said portion of said circuit to block flow of discharge current, and unidirectionally conductive means in series with said meter in said circuit branch to prevent charging current from flowing through said meter and to permit discharge current to flow through the meter.

9. In a system for testing inductance of an inductor, a circuit for supplying unidirectional current pulses to said inductor, a current meter, means to connect said meter in a circuit branch in parallel with said inductor whereby to provide a loop circuit including said inductor and said meter in series, and a non-mechanical rectifier in series with said meter in said circuit branch and arranged in opposition to flow of said pulses in said circuit branch while permitting current flow in said loop circuit from said inductor as an effective source.

References Cited in the file of this patent

UNITED STATES PATENTS

| | | |
|---|---|---|
| 1,786,910 | Jones | Dec. 30, 1930 |
| 2,121,725 | Baumzweiger | June 21, 1938 |